United States Patent
Lesser et al.

(10) Patent No.: US 6,520,424 B1
(45) Date of Patent: Feb. 18, 2003

(54) WINDSCREEN WASHER JET WITH AN INTEGRATED JET CHIP

(75) Inventors: Hans-Jurgen Lesser, Rheinfelden (DE); Mathias Hansel, Rummingen (DE)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/763,896

(22) PCT Filed: Aug. 3, 1999

(86) PCT No.: PCT/EP99/05567

§ 371 (c)(1),
(2), (4) Date: May 15, 2001

(87) PCT Pub. No.: WO00/12361

PCT Pub. Date: Mar. 9, 2000

(30) Foreign Application Priority Data

Aug. 26, 1998 (DE) .......................................... 198 38 764

(51) Int. Cl.⁷ ............................... B05B 1/10; B60S 1/46
(52) U.S. Cl. .................................................. 239/284.1
(58) Field of Search ............................. 239/284.1, 452, 239/284.2, 589, 597, 288, 266, 267, 472, 475, 483, 493, 487, 494, 492; 15/250.002, 250.003, 250.01, 250.04

(56) References Cited

U.S. PATENT DOCUMENTS

| | | | | |
|---|---|---|---|---|
| 3,913,167 A | * | 10/1975 | Frigon | 15/250.04 |
| 3,940,068 A | * | 2/1976 | Mohnach et al. | 239/284 R |
| 4,531,255 A | * | 7/1985 | Yagasaki et al. | 15/250.01 |
| 5,226,199 A | * | 7/1993 | Jacoby | 15/250.001 |
| 6,360,969 B1 | * | 3/2002 | Egner-Walter et al. | 239/284.1 |

* cited by examiner

Primary Examiner—Michael Mar
Assistant Examiner—Davis Hwu
(74) Attorney, Agent, or Firm—Gifford, Krass, Groh, Sprinkle, Anderson & Citkowski, P.C.

(57) ABSTRACT

The inventive windscreen washer jet is used for spraying front or rear windscreens of automobiles and consists of the following: a housing (1) with a connector tube (2) for the spray water and a chamber (3) for integrating a jet chip (4). Said chip has a central opening through which the water flows (5) and from which several semicircular channels (6) are guided outwards in a fan shape. The channels (6) formed in the chip (4) are open towards one end and are blocked off by the chamber walls after the jet has been inserted, so that they are watertight. The channels (6) are formed in the chip (4) in such a way that the width (b) of the channel narrows towards the discharge area and they have a depth of 0.1 to max. 0.2 mm and a width of 0.2 mm to max. 0.4 mm at the discharge end. This ensures that the water jet is discharged at high speed and is therefore able to wet the vehicle windscreen more effectively.

11 Claims, 2 Drawing Sheets

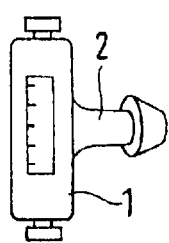
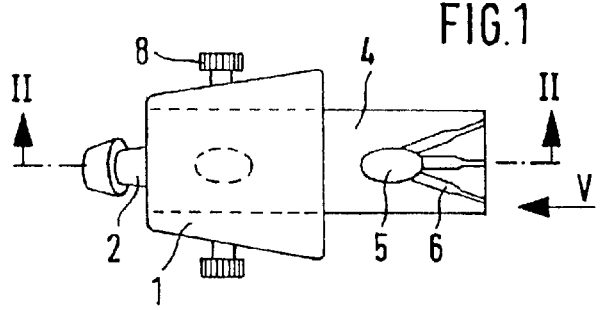
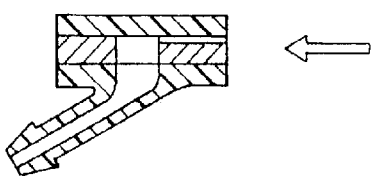
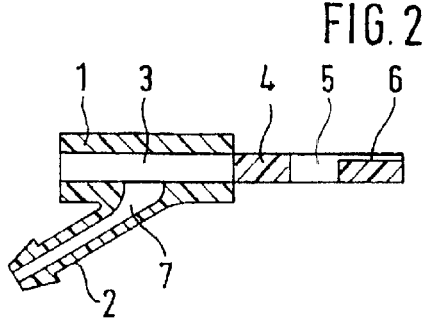
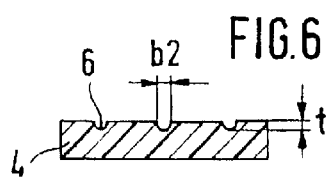
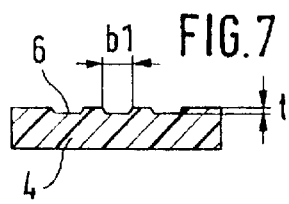
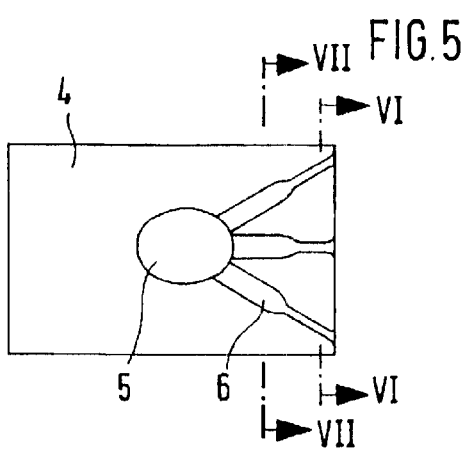
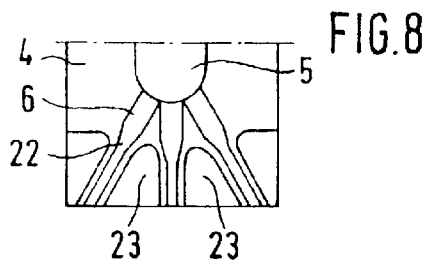
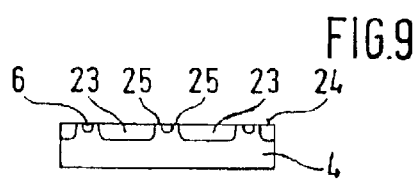
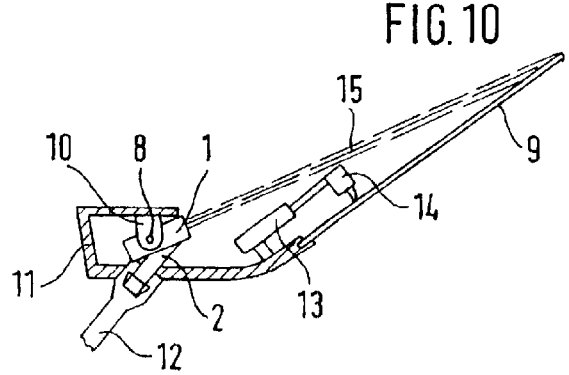

WINDSCREEN WASHER JET WITH AN INTEGRATED JET CHIP

The invention is based on a windshield washer nozzle with a compartment for embedding a nozzle chip provided with flow channels according to EPS 0 044 331. In this known nozzle chip, the flow channels are arranged on both sides of a so-called oscillating compartment, which generates turbulence and, in connection with the channels and the geometry of the side walls, ensures that the water jet emerging from the nozzle oscillates. This oscillatory movement ensures that the emerging water jet will be rapidly moved back and forth across the windshield so that the water will be distributed over the surface covered by the windshield wiper.

This oscillation method requires a relatively large amount of water and consequently results in a relatively fast consumption of the spray water supply. In addition, this fanned water jet is very sensitive to relative wind and is pushed downward, particularly when driving at high speeds. This only results in the poor wetting of the upper half of the windshield and in smearing the windshield with the windshield wipers.

The invention is based on the object of realizing the channel arrangement and design of the nozzle chip in such a way that the water jet emerges with significantly greater force and the windshield is wetted more effectively. The invention also aims to reduce water consumption.

According to the invention, this object is essentially realized in that several approximately semicircular channel grooves extend outwardly from the central water flow-through opening in the form of a fan, where said channel grooves have a depth of not more than 0.2 mm and a width of not more than 0.4 mm at the outlet end. The utilization of nozzle chips makes it possible to realize flow channels with a very small flow cross sections such that the water consumption is significantly reduced. The installation of the chips is very simple and preferably takes place in the mold. If the chip wears out or the flow channels become clogged, the chip can be easily replaced with a new chip.

Additional refinements and embodiments of the invention are defined by the characteristics of the subordinate claims that essentially make it possible to achieve the following advantages:

Due to the width of the channel grooves which, according to claim 2 and, in particular, claim 3, become narrower toward the outlet region, an enormous increase in the flow speed is achieved such that the water jet is very focused until it strikes the windshield.

The arrangement of recesses between the channel grooves within the region of the narrowings in accordance with claim 4 results in a microscopic movement of the relatively thin intermediate walls due to the constantly alternating pressure build-up and pressure drop when the windshield wiper system is actuated. In this way, lime deposits or the formation of other accumulations on the channel walls can be prevented.

It is particularly advantageous if the chip consists of a relatively soft, elastic thermoplastic elastomer in comparison with the hard plastic material of the nozzle body. Thus, the intermediate walls will react flexibly to pressure changes. In addition, the seal between the outer surfaces of the chip and the inner walls of the nozzle body will be improved.

Two embodiments of the invention that are described in greater detail below are illustrated in the drawings. The drawings show:

FIG. 1 is a top view of a windshield washer nozzle housing with a nozzle chip integrally injection-molded thereon, FIG. 2 is the same windshield washer nozzle housing in the form of a section through line II—II in FIG. 1;

FIG. 3 is the same windshield washer nozzle housing in the form of a front view, i.e., viewed in the direction of the arrow V;

FIG. 4 is the same section through the windshield washer nozzle housing that appears in FIG. 2 with the chip inserted;

FIG. 5 is an enlarged top view of the chip;

FIG. 6 is a section through the nozzle channels along line VI—VI in FIG. 5;

FIG. 7 is a section through the nozzle channels along line VII—VII in FIG. 5;

FIG. 8 is another form of the nozzle chip with recesses arranged between the narrow regions of the channel grooves;

FIG. 9 is a front view of this nozzle chip viewed in the direction of the outlet region of the channel grooves;

FIG. 10 is the windshield washer nozzle in the installed state;

Figure 11:
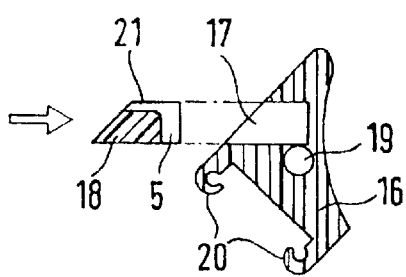
FIG. 11 shows another embodiment of the invention in the form of a sectional through the housing before the nozzle chip is inserted.
Figure 12:
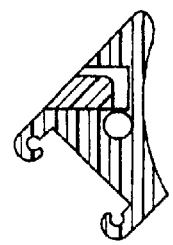
FIG. 12 shows the same embodiment after the insertion of the nozzle chip.

The windshield washer nozzle illustrated in the figures consists of a housing 1 that is preferably manufactured by injection-molding a hard plastic material. A connection piece 2 for supplying the spray water is integrally formed onto the underside of the housing 1. A compartment 3 with rectangular cross section is arranged in the housing 1, with said compartment serving for embedding a so-called nozzle chip 4 that preferably consists of a soft, elastic thermoplastic elastomer material and is injection-molded together with the housing in the same mold. This chip 4 has the same rectangular cross section as the compartment 3 and contains a central flow-through opening 5 for the water jet, with the opening 5 extending through the entire thickness of the chip 4. Several semicircular channel grooves 6 are arranged on the upper side of the chip 4, with said channel grooves extending outward from the central opening 5 in the form of a fan. After the chip 4 is inserted into the compartment 3, the opening 5 is located precisely above the supply line 7 of the connection piece 2 as shown in FIG. 4.

The spray water supplied by a windshield washer system (not shown) reaches the channel grooves 6, which are sealed water-tight relative to the compartment walls when the chip 4 is installed through the nozzle body 1 and the opening 5.

At their outlet end, the channel grooves 6 have a depth between 0.1 mm and 0.2 mm and a width between 0.2 mm and 0.4 mm. The channel grooves are preferably formed in the chip 4 so that they taper toward the outlet end, with the grooves 6 narrowing from an initial width b1 between approximately 0.5 mm and 0.7 mm to between approximately 0.1 mm and 0.2 mm at the outlet. This narrowing of the channels results in a significant acceleration of the water flowing through the channels.

FIGS. 8 and 9 show that recesses 23 may be arranged in the surface 24 of the nozzle chip 4 between the channel grooves 6 in the vicinity of the narrow regions 22. These recesses are separated from the channel grooves 6 by relatively thin intermediate walls 25. The constantly alternating pressure build-up and pressure drop of the spray water which occurs when the windshield washer system is actuated results in an elastic, microscopic deformation of the intermediate walls 25, which are formed to be slightly flexible and to prevent the accumulation of lime or other debris contained in the spray water. This elastic, microscopic deformation can also be facilitated by utilizing a soft, elastic thermoplastic elastomer in the manufacture of the nozzle chip 4.

FIG. 10 shows the windshield washer nozzle in the installed condition underneath the windshield 9. Here, the housing 1 is arranged to pivot in a recess 11 of the window [sic; windshield] frame by means of a holding bracket 10 and holding pins 8 integrally formed onto the housing 1, where the housing is connected to the windshield washer system pump by means of a hose 12 that is attached to the connecting piece 2. A windshield wiper 13 with a wiper arm 14 is also illustrated in its idle position beneath the windshield 9. The water jet 15 is sprayed from the windshield washer nozzle housing 1 onto the windshield 9, above the wiper blade 14, with the jet 15 highly focused due to the geometry of the channel grooves 6 in the nozzle chip 4, striking the windshield 9 at high speed in an approximately linear fashion. Due to the pivoted holding arrangement of the pins 8 in the holding bracket 10, the direction of the emerging water jet 14 relative to the windshield 9 can be optimally adjusted in accordance with the desired angle of impact.

Figure 13:
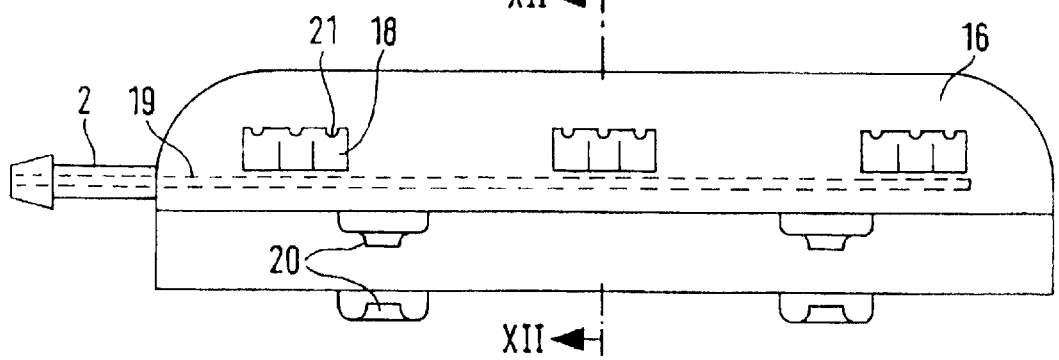
FIG. 13 is a top view of the corresponding housing.
Figure 14:
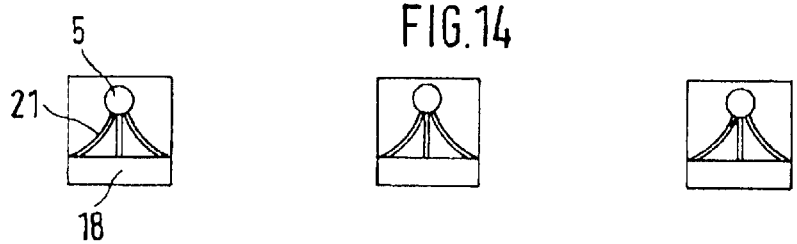
FIG. 14 is a top view of the corresponding nozzle chip.
Figure 15:
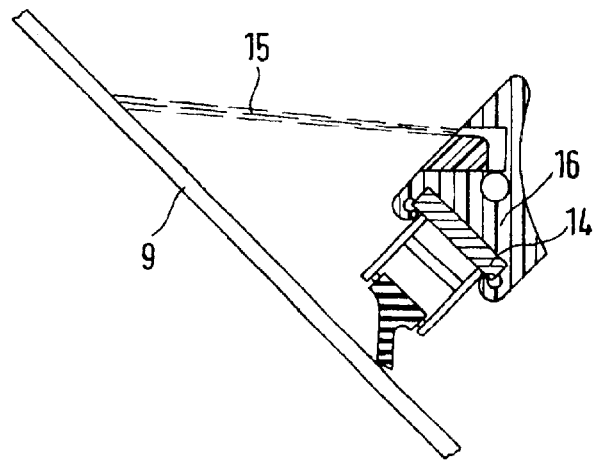
FIG. 15 is the housing with the inserted nozzle chip mounted on a windshield wiper arm.

Another embodiment of the windshield washer nozzle is shown in FIGS. 11–15. This nozzle consists of an oblong housing 16 with several compartments 17 for inserting nozzle chips 18. The housing 16, as shown in FIG. 13, is designed to be mounted on the wiper arm 14 of a windshield wiper 13 so that the windshield washer nozzle moves over the windshield 9 together with the wiper arm 14. The connecting piece 2, through which the spray water is supplied to the individual compartments 17 via a channel 19 integrally formed in the housing 1, is arranged at one end of the housing 16. Flexible holding clamps 20 are integrally formed on the underside of the housing 16 and engage behind the wiper arm 14 after the housing 16 is attached.

The nozzle chips 18 are designed similarly to the chips 4 according to the first embodiment and provided with channel grooves 21 that extend outwardly from the central opening 5 in the form of a fan and have the same cross-sectional geometry as the channel grooves 6 of the chips 4. The emerging water jet 15 is highly focused when it strikes the windshield 9 and always travels back and forth over the windshield 9 together with the windshield wiper arm 14.

What is claimed is:

1. Windshield washer nozzle, consisting of a housing with a connection piece for the spray water and a compartment for embedding a nozzle chip provided with flow channels, with the spray water supplied by the windshield washer system being transported into the compartment (3) through the nozzle body (1), and from there into the channel grooves (6), and with the channel grooves (6) molded into the chip (4) being open toward one side and sealed relative to the compartment walls in a water-tight fashion in the installed condition of the chip (4), characterized by the fact that several semicircular channel grooves (6) extend outwardly from the central water flow-through opening (5) in the form of a fan, with said channel grooves having a depth between 0.1 and 0.2 mm and a width between 0.2 and 0.4 mm on their outlet end.

2. Windshield washer nozzle according to claim 1, characterized by the fact that the channel grooves (6) are molded into the chip (4) such that the channel width b tapers toward the outlet region.

3. Windshield washer nozzle according to claim 2, characterized by the fact that the channel grooves (6) taper from an initial width b1 between approximately 0.5 and 0.7 mm to an outlet width b2 between approximately 0.1 and 0.2 mm.

4. Windshield washer nozzle according to claim 2, characterized by the fact that recesses (23) are arranged in the chip surface (24) between the channel grooves (6) in the vicinity of the narrow regions (22), with said recesses being separated from the channel grooves (6) by relatively thin intermediate walls (25).

5. Windshield washer nozzle according to claim 1, characterized by the fact that the chip (4) is manufactured from a thermoplastic elastomer material that is relatively soft and elastic in comparison with the hard material of the nozzle body (1).

6. A windshield washer nozzle assembly for use with a windshield washer system, said assembly comprising:

a housing having a compartment in communication with fluid from said windshield washer system;

a chip mounted in said compartment, said chip having at least one channel groove extending to deliver fluid from said compartment outwardly to an outlet end of said chip, said at least one channel groove having a semi-circular cross section having a predetermined depth in the range of 0.1 mm to 0.2 mm and a predetermined outer width in the range between 0.2 mm and 0.4 mm at the outlet end.

7. The nozzle of claim 6, wherein said at least one nozzle is a plurality of nozzles arranged to fan outwardly towards the outlet end of the chip.

8. The washer nozzle of claim 6, wherein said at least one channel groove tapers inwardly toward the outlet end.

9. The washer nozzle of claim 6, wherein an interior end of said nozzle has an inner width in the range between 0.5 mm and 0.7 mm and tapers to a predetermined outer width in the range between 0.1 mm and 0.2 mm.

10. The washer nozzle of claim 7, wherein each at least one channel groove is formed between a pair of intermediate walls having a predetermined wall thickness and said chip has a recess between each pair of channels of said plurality of channels, the recess being defined by lands having a thickness greater than the said intermediate walls.

11. The washer nozzle of claim 6, wherein said chip further comprises an elastic thermoplate elastomer material which is softer than the material of the housing.

* * * * *